Figure 1:
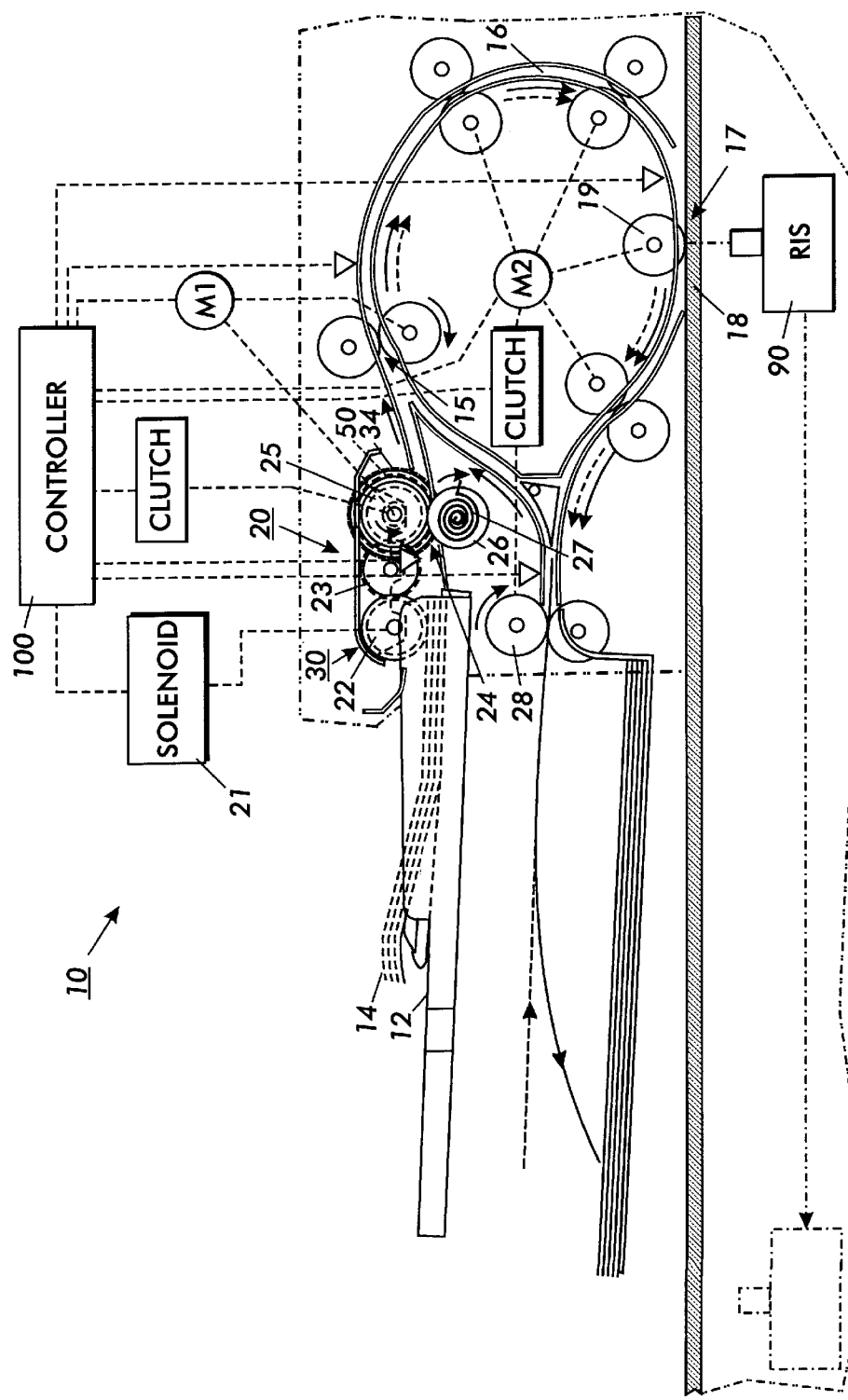

United States Patent [19]
Rubscha

[11] Patent Number: 6,166,394
[45] Date of Patent: Dec. 26, 2000

[54] DUAL BACKGROUND DOCUMENT SCANNER TO ELIMINATE HOLE PRINTOUTS

[75] Inventor: Robert F. Rubscha, Fairport, N.Y.

[73] Assignee: Xerox Corporation, Stamford, Conn.

[21] Appl. No.: 09/206,729

[22] Filed: Dec. 7, 1998

[51] Int. Cl.[7] .................................................. G01N 21/86
[52] U.S. Cl. ...................... 250/559.42; 250/235; 399/184
[58] Field of Search .......................... 250/559.42, 559.36, 250/559.04, 235; 355/40, 50, 52, 67, 74, 75, 77; 399/182, 183, 186, 184, 187

[56] References Cited

U.S. PATENT DOCUMENTS

| | | | |
|---|---|---|---|
| 5,017,963 | 5/1991 | Tuhro ........................................ | 355/218 |
| 5,119,213 | 6/1992 | Graves et al. ............................ | 358/488 |
| 5,488,464 | 1/1996 | Wenthe, Jr. et al. .................... | 355/233 |
| 5,831,741 | 11/1998 | Milillo ...................................... | 356/429 |
| 5,959,290 | 9/1999 | Schweid et al. ....................... | 250/208.1 |

*Primary Examiner*—Que T. Le
*Assistant Examiner*—Thanh X. Luu

[57] ABSTRACT

A dual mode document aperture imaging prevention system and document edge location system, using the same digital document imager, for imaging different sizes of moving document sheets, some of which may have punched notebook or binder holes or other apertures. Both a black or substantially light absorbing imaging background surface area and a white or substantially light reflective imaging background surface area are automatically selectably provided in the same document imaging station as document backing surfaces for the two respective functions. The dark imaging background is automatically provided to be illuminated and imaged for document edge detection, and the light imaging background may be selected to be automatically provided for illuminating and imaging the body of the document to prevent imaging any apertures of any apertured document sheets. The two different imaging backgrounds may be provided by automatically slightly rapidly shifting the imager's imaging position between the two adjacent imaging background areas, or by slightly sifting a backing baffle member having the two differently colored areas relative to a fixed position imager.

7 Claims, 4 Drawing Sheets

DUAL BACKGROUND DOCUMENT SCANNER TO ELIMINATE HOLE PRINTOUTS

Cross-referenced, incorporated by reference, and cited as background art, are commonly assigned copending patent applications by Stuart A. Schweid, et al., filed Jan. 8, 1998, as U.S. App. Ser. Nos. 09/004,346 (now U.S. Pat. No. 5,959,290), 09/004,351 and 09/004,355. Other copending commonly assigned applications related thereto are U.S. App. Ser. Nos. 09/004,186, 09/004,350 (now U.S. Pat. No. 6,078,051) and 09/004,674.

Disclosed is an improved system for preventing the undesired imaging of document apertures by an imaging system, yet providing appropriate document edge detection, preferably with the same imaging system, and especially in a moving document scanning system. Commonly encountered document apertures include paper punch holes, edge tears, dog-ears, sprocket holes, and the like.

There are particular problems in imaging such documents which have holes or other apertures therein, most commonly, the punched holes in pre-punched, or subsequently hole punched, paper sheets, but including other apertures in originals or other documents, such as tears, dog-ears (torn away or folded over corners of the sheet), and/or the sprocket-feeding holes found along the edges of computer form fed (CFF) or fan-fold web paper, or burst segment sheets thereof. Common examples of documents with punched holes spaced along one side edge area are documents sheets which were part of a two or three ring notebook, or spiral binder. However, two hole punches can also be found along the top edge of documents, such as papers in patent application files. Such apertures can be incorrectly perceived and imaged as if they were image information when the document is imaged. When copies are printed from that original image, such aperture areas can print out as undesirable dark areas, such as large black dots or circles printed on the copies where the punch holes were in the originals. Thus, avoiding these known problems of imaging or printing black holes from hole punched originals, and the like, is a desired feature, especially, as a customer option for customers with such originals.

This is particularly a problem with moving document, document scanning, digital imaging systems in which there is desirably provided black (dark, light absorbing) baffles and/or dark document feed wheels as the imaging background in the imaging area. A particular known reason for utilizing such a black imaging background in a moving document imaging system, such as a constant velocity transport (CVT) system, is the need to detect the side edges of various different document sizes that may be fed into the imaging station, especially in a center-registered document feeding system, so as to determine the start/stop coordinates of the transverse (axial) fast scan operation of a digital imaging bar imager, especially, for the first document sheet of a set being fed where the rest of the sheets in the set may be assumed to have the same width in their feeding direction. The precise lead edge and/or trail edge of the documents may also be desirably detected with the imager in the imaging station, rather than requiring separate sheet sensors. Using the imager to detect the document edges also avoids precise calibration of the imager position relative to the document path. A black background in the imaging area can assist that by increasing the optical contrast with a (normally white edged) document entering or leaving the image area, and reflecting the imaging illumination, in contrast to the absence of any document in the image area, in which case the dark imaging background absorbs the imaging illumination. Dark imaging station document backing baffles and rollers may also be desirable for other known reasons, e.g., preventing inadvertent "show through" or "print through" of duplex images on the backsides of thin, or otherwise partially translucent, duplex printed originals. Even optical document copiers in which the document is imaged while held stationary on a large platen and overlaid by a white platen cover can have these problems.

To express this problem in other words, for a scanner to determine the presence, exact location, and size of a document being imaged in a moving document scanning system with the imaging system, the document is preferably passed between the scanner and a black background. However, this can cause documents with pre-punched holes or other apertures to produce images which print on copies thereof as black spots or black circles. Likewise, if a document corner is torn or missing they can print as black corners. These missing portions of the document can show up as dark areas on either electronically displayed or printed copies, and whether they are printed immediately, faxed or subsequently or remotely printed.

Automatically electronically removing solid black areas of the scanned-in image is not acceptable since that could also remove actual image data, such as large block printed letter titles, bars, or graphics. Selectively manually electronically "painting" over such areas would be too time consuming in most cases, even if available.

Referring to the above-cited and other art, there are various digital image processing systems for recognizing, and eliminating by image processing the hole patterns in the originals being imaged. Also of interest, for an image input device with a background detection arrangement and document edge detection, is Xerox Corporation U.S. Pat. No. 5,017,963, issued May 21, 1991 to Richard W. Tuhro. Some of these digital image processing systems utilize a uniquely finely patterned image background on the baffle or backing plate behind the document being imaged, which pattern can be electronically recognized by its electronic signature when it images through a hole in the document sheet, and thus be electronically eliminated, on the assumption that actual text data would not have such a pattern. However, customers that do not normally ever image apertured original documents may not want such a feature implemented, and have no need to even risk any image loss. For example, some "bullet" images on a document, such as are used to highlight points or paragraphs, might be electronically mistaken for a document punch hole image if similar in size thereto, and thus inadvertently deleted (replaced with a default white area), in some electronic image re-processing systems.

It is known in document imaging systems in which a stationary document on a platen is electronically scanned by an image scanner moving under the platen, to provide a black or white or bar code or other calibration strip to one side of the platen outside of the document imaging area and normal scanning travel, to which the image scanner can be moved to calibrate its optical sensors. E.g., Xerox Corp. U.S. Pat. No. 5,119,213 issued Jun. 2, 1992 to James R. Graves, et al, (D/90133) and other art cited therein on electronic document imaging.

Another type of hole detection, for copy sheets, is disclosed in Xerox U.S. Pat. No. 5,831,741 issued Nov. 3, 1998 to Willam D. Milillo, based on Application Ser. No. 08/876,173, and entitled "Method and Apparatus for Detecting Holes in Copy Media".

Of interest by way of further detail and background on one example of a constant velocity transport for electronic document imaging, like that in FIG. 1 here, in which the present system may be incorporated and utilized, is Xerox Corporation U.S. Pat. No. 5,488,464, issued Jan. 30, 1996 to Steven J. Wenthe, Jr., et al. With regard to that exemplary embodiment, in said U.S. Pat. No. 5,488,464 reference is made in particular to the baffle 69 in FIG. 4 and the brief description at the top of column 15, stating that: "document edge detection can be enhanced by use of a spectral (mirror), superwhite, black, colored or other non-white image scanning background, e.g., on the surface of roller 47, and/or an associated baffle, at least in those areas in which document edges are being detected."

Disclosed in the examples herein is a simple optional system and solution for eliminating the above-described problems without requiring any, much less complex, digital image processing, and without risking any loss of image data that might be accidentally electronically removed if too closely corresponding to a patterned background.

A specific feature of the specific embodiment(s) disclosed herein is to provide in a document imaging system with a document apertures image prevention system, wherein different document sheets, which may include hole punched or other apertured document sheets, are sequentially moved past a document scanning imaging station by a document feeding system to be illuminated by a document illumination system and imaged by a document imager in said document imaging station, and wherein at least one edge of a document sheet is detected in said document imaging station by said document imager, the improvement comprising: a dual mode imaging background system, said dual mode imaging background system comprising a substantially dark light absorbing imaging background surface area and a substantially light reflective imaging background surface area for said document imaging station, said dual mode imaging background system automatically selecting said substantially dark light absorbing imaging background surface area to be illuminated by said document illumination system and imaged by said document imager in said document imaging station for said at least one edge of a document sheet is detected in said document imaging station by said document imager, and said dual mode imaging background system automatically selecting said substantially light reflective imaging background surface area to be illuminated by said document illumination system and imaged by said document imager in said document imaging station for at least the apertures of said apertured document sheets being imaged in said document imaging station by said document imager.

Further specific features disclosed herein, individually or in combination, include those wherein said dual mode imaging background system is only optionally actuated in a selectable document apertures image prevention mode; and/or wherein said dual mode imaging background system comprises a movable document backing baffle member with two adjacent but differently colored first and second surface areas, and wherein said documents move between said movable document backing baffle member and said document imager; and/or wherein said dual mode imaging background system comprises a stationary image background member positioned in said imaging station opposite from said document imager and having two laterally adjacent but differently colored first and second surface areas, and wherein said dual mode imaging background system further comprises an imager repositioning system for automatically slightly laterally repositioning said document imager in said imaging station from a first imaging position for document edge detection which is imaging said first image background surface area to a second and closely adjacent imaging position for imaging documents which is imaging said second image background surface area, and wherein said documents move in between said image background member and said document imager; and/or wherein said dual mode imaging background system imager repositioning system rapidly moves said document imager from said first imaging position to said second imaging position after a document to be imaged arrives at said first imaging position to be edge detected and before said document being imaged arrives at said second imaging position to be imaged.

In general, in reproduction apparatus such as xerographic and other copiers and printers or multifunction machines, it is increasingly important to provide faster yet more reliable and more automatic handling of the physical image bearing sheets. It is desirable to reliably feed and accurately register document and/or copy sheets of a variety and/or mixture of sizes, types, weights, materials, humidity and other conditions, and susceptibility to damage. In particular, it is desirable to minimize sheet double-feeding (mis-separations), misfeeding, skewing, jamming, wear or damage. The sheets which may be handled in or outputted from reproduction apparatus may even have curls, wrinkles, tears, "dog-ears", cut-outs, overlays, tape, paste-ups, punched holes, staples, adhesive, slippery areas, or other irregularities. Sheets can vary considerably even if they are all of the same "standard" size, (e.g. letter size, legal size, A-4, B-4, etc.). They may have come from different paper batches or have variably changed size with different age or humidity conditions, different imaging, fusing, etc.

Avoidance of sheet skewing or other misregistration, or feed timing errors is also important for proper imaging. Otherwise, dark borders and/or edge shadow images may appear on the copy sheet, and/or information near an edge of the image may be lost. Sheet misregistration or misfeeding can also adversely affect further feeding, ejection, and/or stacking and finishing.

The disclosed system may be operated and controlled by appropriate operation of conventional control systems. It is well known and preferable to program and execute imaging, printing, paper handling, and other control functions and logic with software instructions for conventional or general purpose microprocessors, as taught by numerous, prior patents and commercial products. Such programing or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs.

It is well known that the control of document and copy sheet handling systems may be accomplished by conventionally actuating them with signals from a microprocessor controller directly or indirectly in response to simple programmed commands, and/or from selected actuation or non-actuation of conventional switch inputs such as switches selecting the number of copies to be made in that job or run, selecting simplex or duplex copying, etc. The resultant controller signals may conventionally actuate various conventional electrical solenoid or cam-controlled sheet deflector fingers, motors or clutches, or other components, in programmed steps or sequences. Conventional sheet path sensors or switches connected to the controller may also be utilized for sensing, counting, and timing the positions of sheets in the sheet paths of the reproduction apparatus, and thereby also controlling the operation of sheet feeders and inverters, etc., as is well known in the art.

In the description herein the term "document" refers to image bearing sheet being imaged, and "sheet" refers to a usually flimsy physical sheet of paper, plastic, or other suitable physical substrate for images. A "copy sheet" may be abbreviated as a "copy", or called a "hardcopy". A "job" is normally a set of related sheets, usually a collated copy set copied from a set of original document sheets or electronic document page images, from a particular user, or otherwise related. A "simplex" document or copy sheet is one having its image and any page number on only one side or fare of the sheet, whereas a "duplex" document or copy sheet has "pages", and normally images, on both sides. The terms imager or imaging system as used herein can encompass any of various known digital light detecting elements or pixel bars, with or without lenses, or laser scanners, etc.

It will also be understood that the term "white" as used herein in connection with the surfaces of an imaging background system or member is intended to broadly encompass various backgrounds that reflect or re-transmit to the imager's illumination system a substantial percentage of the imaging system light applied thereto. While the various types of well known white light diffusing backgrounds typical of platen covers and the like are preferred, other non-white but relatively good light reflective colors could be utilized, particularly for digital imaging. Likewise, the term "black" as used herein in that connection applies broadly to any of various substantially light absorbing surfaces as "seen" by the imaging system. Either may comprise any of various colored plastic or metals, and/or surface treatments, such as anodization, paints, or the like, on a suitable surface on the opposite side of the document path from the image scanner, i.e., behind the document in the imaging area. The colored background member may also serve a dual function as a sheet path baffle or guide for the document, as in said U.S. Pat. No. 5,488,464, but that is not necessary in all cases.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Figure 2:
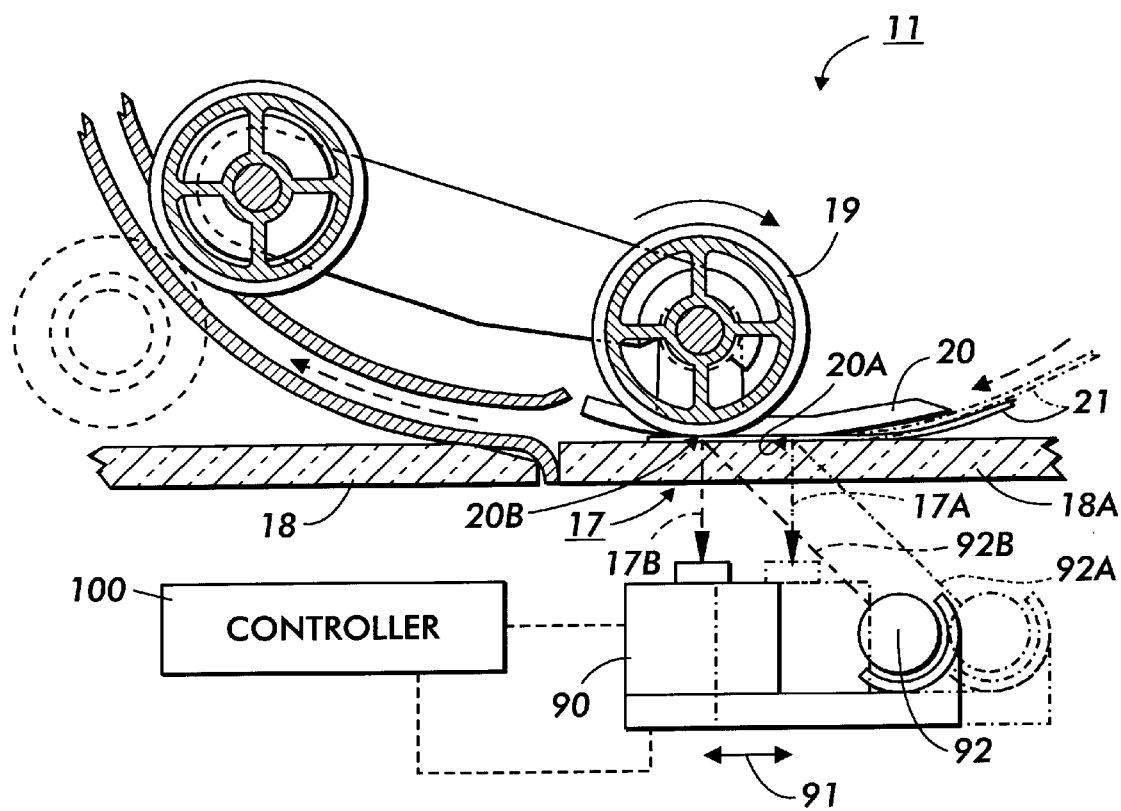
Figure 3:
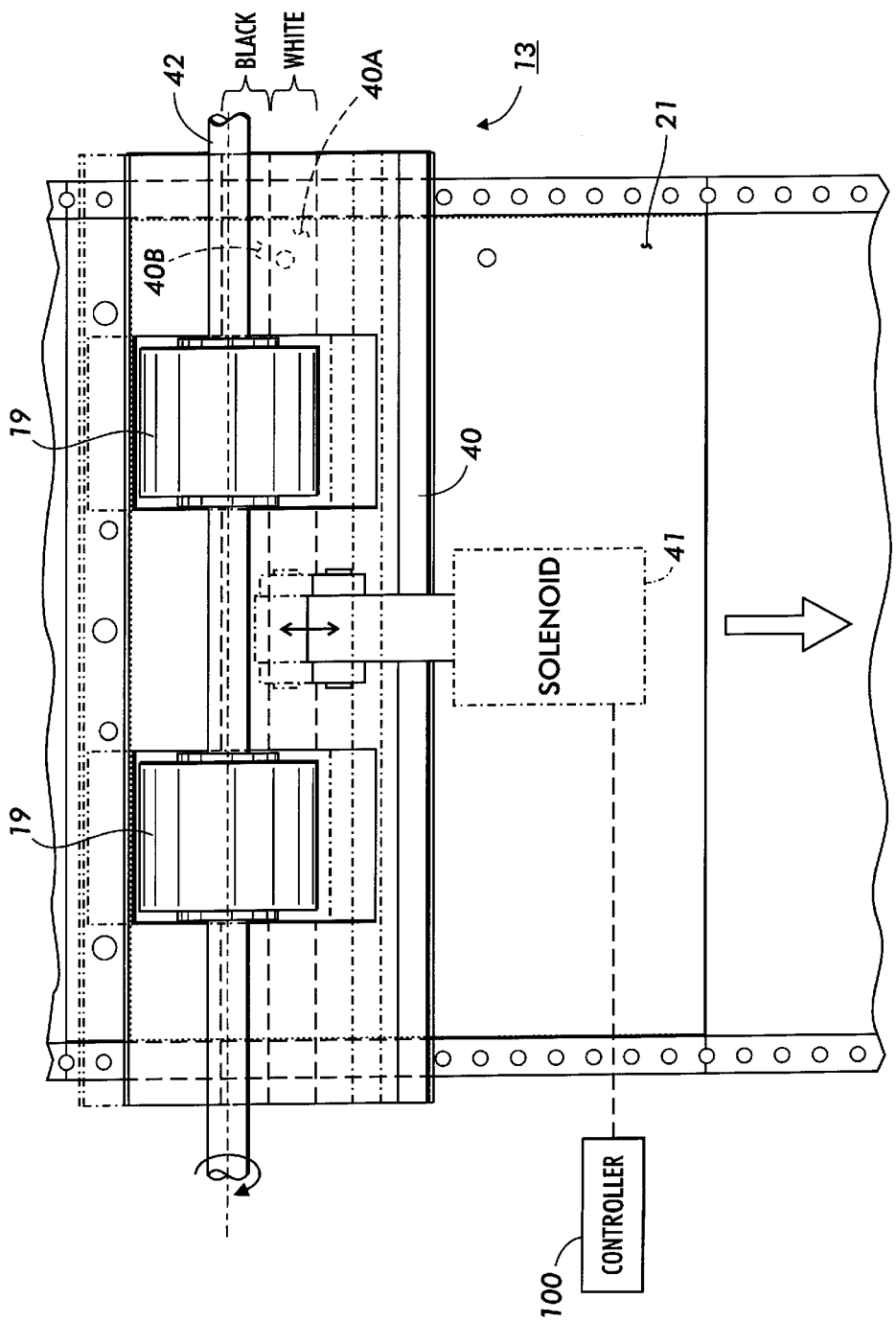
Figure 4:
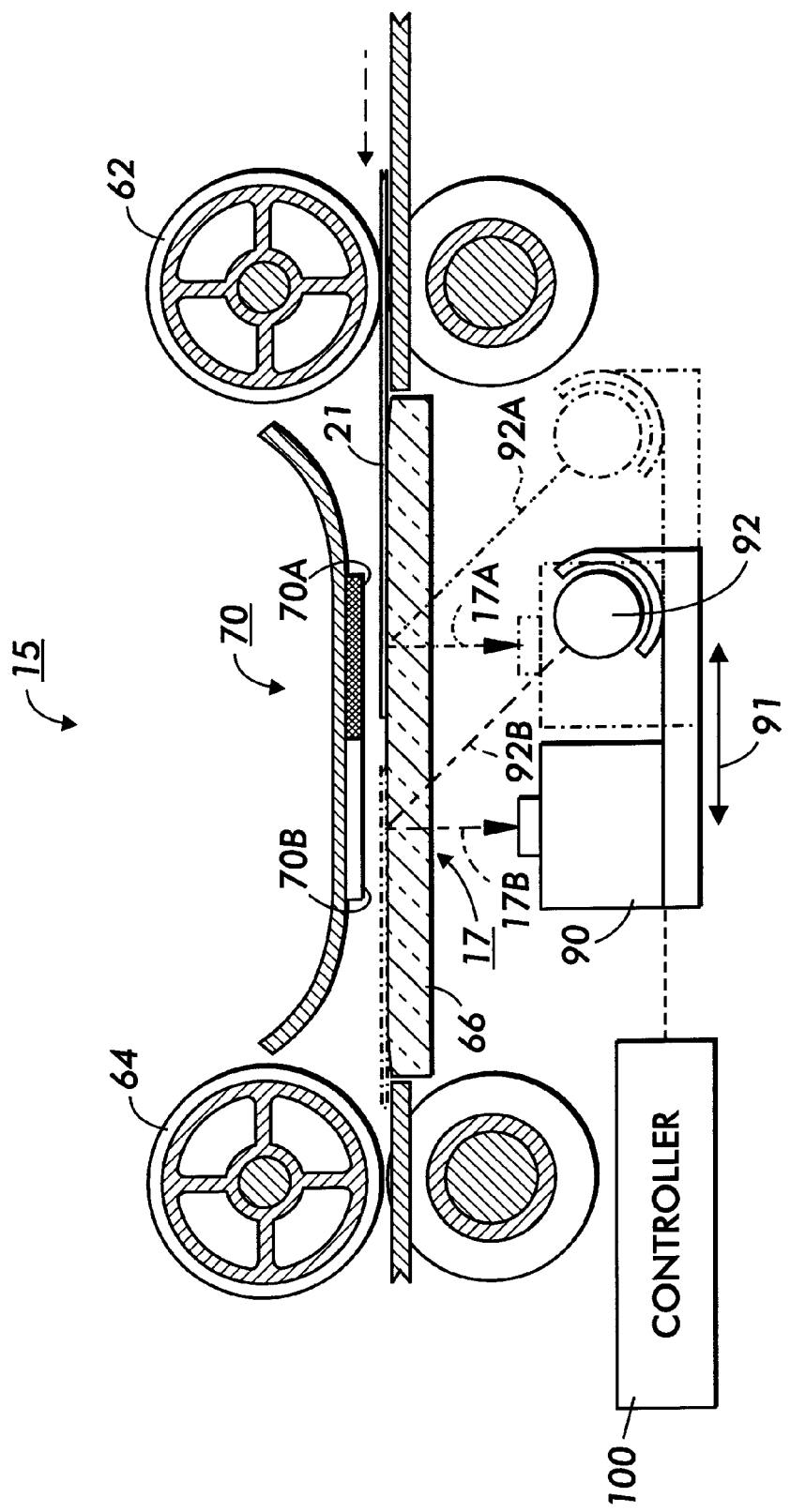

Various of the above-mentioned and further features and advantages will be apparent from the specific apparatus and its operation described in the examples below, and the claims. Thus, the present invention will be better understood from this description of specific embodiments, including the drawing figures (approximately to scale) wherein:

FIG. 1, labeled "prior art", is a schematic frontal view of one example of an automatic document feeding and moving document digital imaging system with which an embodiment of the subject document aperture image deletion or prevention system may be utilized in its document imaging area;

FIG. 2 is an enlarged view of a moving document imaging area generally corresponding to that of FIG. 1, showing a stationary two color baffle and an imager position shifting system providing one embodiment of the subject document apertures imaging prevention system;

FIG. 3 is an enlarged broken-away top view of an imaging area generally corrsponding to that of FIG. 1, showing a stationary two color baffle and imager position shifting system providing a second embodiment of the subject document aperture image deletion system with a moving baffle, and illustrating a document being imaged having (for illustrative purposes) both three hole and two hole punched apertures and CFF edge sprocket hole apertures; and FIG. 4 is a schematic side view of another known type of moving document electronic imaging system, illustrating another application of the first embodiment of FIG. 2.

Describing now in further detail the exemplary embodiments with reference to the Figures, there is shown an embodiment 11 of FIG. 2, 13 of FIG. 3 and 15 of FIG. 4. There is shown in FIG. 1, labeled "prior art", a known document handler and digital imaging system (DH) 10, merely by way of one example of an automatic document feeding and moving document digital imaging system with which an embodiment of the subject document aperture image deletion system may be utilized. The present invention is not limited thereto. This DH 10 and its operation is described and shown in the above cited and incorporated U.S. Pat. No. 5,488,464, issued Jan. 30, 1996 to Steven J. Wenthe, Jr., et al, and hence need not be re-described herein. Likewise, the same known controller 100, imager 90 and associated imager illumination system 92 may be common to all of the exemplary embodiments here, and need not be re-described herein. The imager 90 is present, but underneath, and thus not visible in, the view of FIG. 3 of embodiment 13. (The embodiments 11 and 15 of FIGS. 2 additional have an imager 90 repositioning system 91, as will be described.)

FIG. 2 here illustrates in an enlarged view a modified form of the imaging station 17 area of said FIG. 1 DH 10 example, showing a stationary two color baffle 20 and the imager 90 position shifting system 91. This is providing one embodiment 11 of the subject document apertures imaging prevention system, as will be further described later herein. Likewise, FIG. 3 illustrates, in a broken-away top view, another modified version of the imaging station 17 of said FIG. 1 example, providing a second embodiment 13 of the subject document aperture image deletion system. This embodiment 13 has a two color baffle 40 which selectively shifted relative to a stationary imager thereunder, which imager can be the same as the imager 90 in FIG. 2.

Thus, three different embodiments will be disclosed and described herein. In both of the embodiments of FIGS. 2 and 4 the document imager is programmed to move between two different but closely adjacent imaging positions in the same imaging station; one of which underlies a black background, and the other of which underlies a white background, to change the imaging background for a document lead edge area versus document apertured areas. The embodiment of FIG. 3 discloses a mechanical movement of a bi-color background baffle member relative to the same imaging position of the imager, to also change the imaging background for a document lead edge area versus document apertured areas.

Describing the different specific embodiments here in general, the disclosed document aperture imaging prevention system of all the embodiments herein utilizes a two part, two areas, or bi-color imaging background, such as part black and part white, to give a selection of two different but closely adjacent imaging background areas of different light reflectivity in the same imaging station. At start up and/or before the lead edge of the first document reaches the imaging station, a black image background is preferably provided for the imager, to enable the advantages of higher sheet edge detection contrast, as described above. Then, subsequently, for imaging of the rest of the document, and/or those areas of the document with holes in particular, a white imaging background is provided, to cause any document holes or other missing parts to image as white, or and thus become effectively invisible or greatly reduced on both the image and the ultimate copies of the image from the imager.

This automatic change in imaging background feature can be provided as the normal software programmed mode of operation, or it can be activated upon a customer directed or selected enabling input, that is, only provided for those document scanners which are being utilized by customers having originals with holes and who do not want them visible on reproductions. In other words, the subject system can be a feature which is selectively available or selectively turned off, providing the document feeding and imaging unit has the capability.

The disclosed document aperture image suppression system can be assisted in a known manner by the setting of the threshold imaging level, so that the imaging illumination light reflected from the white or other light background provided here behind all the document apertures will have the same output level as the light reflected from the non-image areas of the document even if the document is not as "white" as the background, or vice versa.

As is also shown in said U.S. Pat. No. 5,488,464 (in FIG. 4) and in the embodiments of FIGS. 2 and 3 here, it is known for the image background baffle to be apertured to allow for sheet transport (document feeding) rollers to extend therethrough to engage the document being imaged, to hold the document against the imaging platen, and thus feed the document uniformly through the imaging station for uniform constant velocity scanning at a constant focal length distance from the imager. Where document feed rolls are thus in the imaging area, they may be dark, for the reasons explained above, since the rollers form part of the imaging background. However, in all of the present embodiments, such feeding rollers are desirably sized and positioned transversely or laterally of the document path so that they do not overlie any of the normal standard hole pattern document apertures, either two hole (both orientations) or three hole punched paper or CF sprocket holes web being fed through the imaging system, as shown in FIG. 3. This may be provided as shown in FIG. 3 by having feed rolls engaging only central areas of the document which are inside of or in between the first and second, and second and third, holes respectively of three-hole punched standard paper, and either inside or outside of the positions of standard two-hole punched paper. Note in this connection that it can be assumed that almost all three-hole punched paper being fed to be imaged will be standard letter size (8½×11 inch) paper or A4 sheets of similar size, or folded 11×17 inch paper, which is also letter size, or either legal size or 11×17 inch sheets being fed lead or narrow side first, so that, as seen by the imager, only 8½ or 11 inch dimensions will normally be scanned.

An alternative known document feeding system, as in the embodiment of FIG. 4, is to have the document feeding rollers at opposite sides of, and completely outside of, the imaging station, with the document held down against the platen glass (or held in position in an imaging aperture) by an unapertured backing baffle extending between the feeding rollers.

An alternative to a single repositionable baffle with two differently colored areas that is shifted, as in the embodiment 13 of FIG. 3, would be to have a stationary white baffle and a solenoid or other mechanism intermittently slide a thin dark baffle, such as a flexible black Mylar strip, thereunder, when the black background for document edge detection is desired.

In both of the embodiments 11 and 15 of FIGS. 2 and 4, the imager 90 slightly repositions for document aperture image prevention by shifting from imaging under one imaging background area to the other with a repositioning system 91. The two different imaging backgrounds can thus be provided by the exposed surfaces of a stationary image background baffle or plate member positioned in the imaging station opposite from the document imager and having two laterally adjacent but differently colored first and second surface areas. The documents, of course, move in between this dual background member and the platen, and thus between the background member and the imager.

As noted, these two dual mode imaging background system embodiments of FIGS. 2 and 4 further comprise an imager repositioning system 91, which may be simple software programming in the controller 100 of the existing, known, under-platen servo or stepper motor reciprocal scanning drive of the imager (illustrated by the movement arrow in FIG. 1). This imager scanning drive is simply modified by adding software instructions for automatically slightly laterally repositioning the document imager 90 in the imaging station 17 from a first imaging position 17A which is imaging the first, dark, surface area to a second and closely adjacent imaging position 17B imaging the second, white, surface area. This movement of the integral imager 90 and illuminator 92 is shown by the movement arrow 91 and the difference between the solid and phantom line views thereof in both FIGS. 2 and 4. This imager repositioning system 91 rapidly moves the document imager 90, faster than the document feeding velocity, from said first imaging position 17A to said second imaging position 17B only after the lead edge of the document 21 being imaged had arrived at the first imaging position and been measured there, but before that same moving document arrives at the second imaging position, so that as by the time the (slower) moving document arrives at the second imaging position 17B the imager is in that position ahead of (before) the document's arrival there, so as to be able to image all of the document in the second imaging position.

The principle difference between the embodiment 11 of FIG. 2 and the embodiment 15 of FIG. 4 is that in FIG. 2 (as in FIG. 3) the document feed roller(s) 19 are, as discussed above, in the document imaging position, in between or extending through apertures in the background imaging baffle 20. Whereas, in the embodiment 15 of FIG. 4, the document feeding rolls 62 and 64 are at opposite sides of the imaging station 17, not exposed in either imaging position 17A or 17B, and thus an unapertured baffle or backing plate 70 may be used, providing an unapertured white imaging surface area 70A and an unapertured black imaging surface area 70B.

Although not relevant here, the embodiment 11 of FIG. 2 also differs in that its glass platen 18 is split, with the imaging station 17 there having a separate but otherwise common section 18A to provide for the output baffle to extend down therebetween for ease of sheet removal therefrom, and to allow scanning of the adjacent much larger platen 18 with the same imager 90, as described in greater detail in Xerox Corp. U.S. Pat. No. 5,339,139. Whereas, the embodiment 15 of FIG. 4 has a single narrow platen 66 so that the feed rollers 62 and 64 can have their nips slightly above or co-planer with the upper surface of the platen 66.

Adding also now some more specific descriptions of the FIG. 3 embodiment 13 components to the prior general descriptions, the underside of its movable baffle 40 also has at least two differently colored (light and dark) background imaging areas 40A and 40B, which are respectively repositioned by solenoid 41 over a single, fixed, imaging position 42, under the document feed rollers 19. That is, in this embodiment 13 the background changes by moving, and thus changing (shifting or switching) the imaging background areas from light to dark as seen by the imager 90 while the imager 90 remains in a single imaging position 42, instead of shifting the imaging position relative to the background areas, as in the other embodiments here.

For any of these embodiments, where entire (not just lead edge) document side edge detection is desired, such as for precise document skew detection, dark baffle areas or temporary inserts thereof could be provided at the outer transverse sides of the document path extending into the normal document side edge positions but not extending into the normal hole punch areas of the document.

While the embodiments disclosed herein are preferred, it will be appreciated from this teaching that various alternatives, modifications, variations or improvements therein may be made by those skilled in the art, which are intended to be encompassed by the following claims.

What is claimed is:

1. In a document imaging system with a document apertures image prevention system, wherein document sheets, some of which include apertured document sheets, are moved past a document scanning imaging station by a document feeding system to be illuminated by a document illumination system and imaged by a document imager in said document imaging station, and wherein at least one edge of a document sheet is detected in said document imaging station by said document imager, the improvement comprising:

a dual mode imaging background system,
   said dual mode imaging background system comprising a substantially dark light absorbing imaging background surface area and a substantially light reflective imaging background surface area for said document imaging station,
   said dual mode imaging background system automatically selecting by mechanical movement said substantially dark light absorbing imaging background surface area to be illuminated by said document illumination system and imaged by said document imager in said document imaging station, and
   said dual mode imaging background system automatically selecting by mechanical movement said substantially light reflective imaging background surface area to be illuminated by said document illumination system and imaged by said document imager in said document imaging station for said apertured document sheets being imaged in said document imaging station by said document imager.

2. The document imaging system with a document apertures image prevention system of claim 1, wherein said dual mode imaging background system comprises a movable document backing baffle member with two adjacent but differently colored first and second surface areas, and wherein said document sheets move between said movable document backing baffle member and said document imager.

3. The document imaging system with a document apertures image prevention system of claim 1, wherein said dual mode imaging background system comprises a stationary image background member positioned in said imaging station opposite from said document imager, said stationary image background member having two laterally adjacent but differently colored first and second surface areas, and wherein said dual mode imaging background system further comprises an imager repositioning system for automatically slightly laterally repositioning said document imager in said imaging station from a first imaging position for document edge detection which is imaging said first image background surface area to a second and closely adjacent imaging position for imaging documents which is imaging said second image background surface area, and wherein said document sheets move in between said image background member and said document imager.

4. The document imaging system with a document apertures image prevention system of claim 3, wherein said dual mode imaging background system rapidly moves said document imager from said first imaging position to said second imaging position after a document sheet to be imaged arrives at said first imaging position to be edge detected and before said document being imaged arrives at said second imaging position to be imaged.

5. In a document imaging system with a document imager and a document imaging background member, in which a document is imaged by said document imager in between said document imager and said document imaging background member, wherein at least a portion of said document imaging background member is behind at least a portion of said document which is being imaged by said document imager, the improvement wherein;

said document imaging background member has at least two different imaging background surface areas, a light absorbing imaging background surface area and a light reflective imaging background surface area;
   an imaging mode shifting system provides at least two different selectable imaging modes, a normal imaging mode and a document holes imaging suppression mode;
   said imaging mode shifting system including a mechanical movement system providing selectable relative transverse movement between said document imaging background member and said document imager,
   said mechanical movement system causing said light absorbing imaging background surface area to be positioned behind said portion of said document which is being imaged by said document imager in said normal imaging mode, and
   said mechanical movement system causing said light reflective imaging background surface area to be positioned behind said portion of said document which is being imaged by said document imager in said document holes imaging suppression mode.

6. The document imaging system of claim 5 wherein said mechanical movement system moves said document imaging background member between two different positions for said two different selectable imaging modes.

7. The document imaging system of claim 5 wherein said mechanical movement system moves said document imager between two different positions for said two different selectable imaging modes.

* * * * *